July 8, 1952
C. F. TAYLOR
2,602,917
DYNAMOMETER CONVERTER AMPLIFIER
Filed Aug. 18, 1950
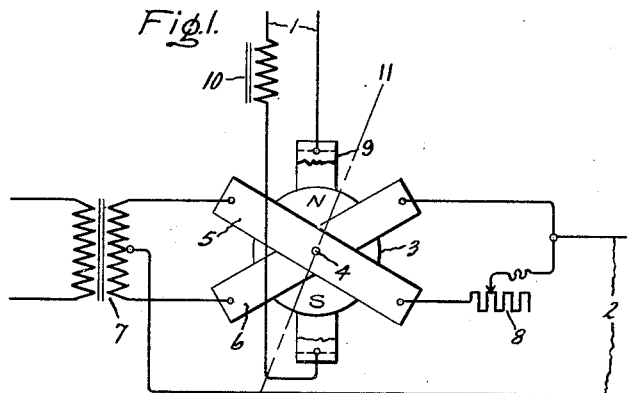
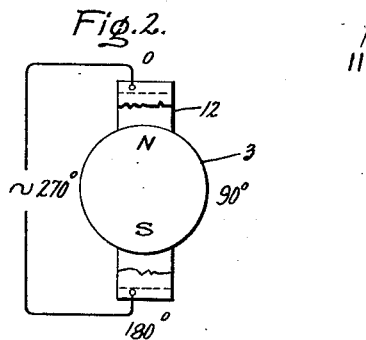
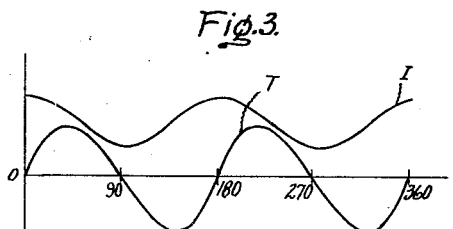
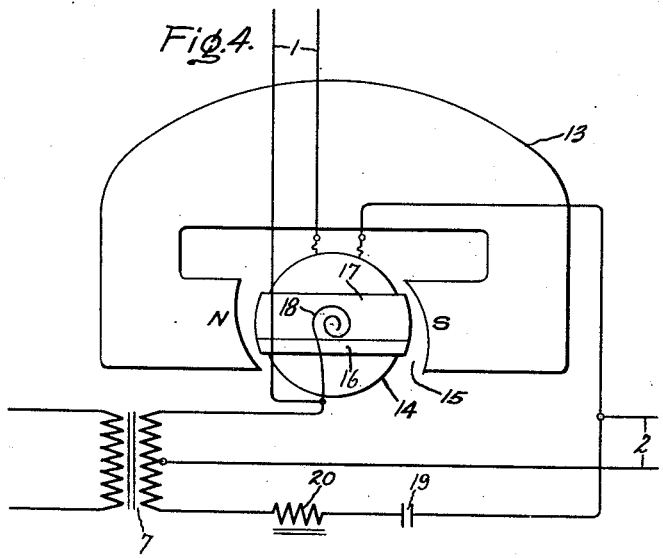
Inventor:
Clement F. Taylor,
by Russell A. Warner
His Attorney.

Patented July 8, 1952

2,602,917

UNITED STATES PATENT OFFICE 2,602,917

DYNAMOMETER CONVERTER AMPLIFIER

Clement F. Taylor, Peabody, Mass., assignor to General Electric Company, a corporation of New York Application August 18, 1950, Serial No. 180,215

5 Claims. (Cl. 323—75)

My invention relates to apparatus intended primarily for converting minute direct current quantities into proportional alternating current of greatly increased power magnitude, and its object is to accomplish this with simple, inexpensive apparatus of high reliability.

In carrying my invention into effect, I employ a form of dynamometer having one or more alternating current coils and a direct current coil, which coils cooperate with and are relatively movable with respect to a permanent magnet field. In the preferred form of my invention the coils are stationary and the field movable, since this avoids the necessity of movable electrical connections.

The features of my invention which are believed to be novel and patentable will be pointed out in the claims appended hereto. For a better understanding of my invention reference is made in the following description to the accompanying drawing in which Fig. 1 represents an A.-C. bridge circuit embodying the preferred rotary permanent magnet form of my invention; Fig. 2 is a structure corresponding to portions of the converter of Fig. 1 used for explanatory purposes; Fig. 3 shows impedance and torque curves characteristic of the device of Fig. 2 for different rotor positions; and Fig. 4 represents an embodiment of my invention where the permanent magnet field is stationary.

One form of my converter amplifier is shown in Fig. 1 and its purpose is to convert a feeble direct current signal received at terminals 1 to proportionate alternating current at output terminals 2, and at the same time greatly amplify the signal during such conversion. The converter includes a well stabilized permanent magnet 3 of cylindrical shape polarized across a diameter as represented and pivoted for free rotation on an axis 4. Surrounding the magnet 3 is a pair of alternating current coils 5 and 6 displaced at an angle to each other. These coils are connected in series relation across an alternating current supply such as the transformer 7, and form with the two halves of the secondary winding of the transformer a bridge circuit having output terminals connected across the bridge from the center of the transformer winding and between the coils leading to the output terminals 2. In the bridge circuit I may include a bridge balancing adjustable impedance 8. Angularly displaced midway between the alternating current coils is a third direct current input coil 9 connected to the D.-C. input signal terminals 1. The three coils are symmetrically disposed about the permanent magnet 3, although the angles between the coils are not necessarily equal.

Assume, now, with no D.-C. signal and no current in coil 9, that the bridge is balanced and that the alternating current flowing in coils 5 and 6 is equal. The coils 5 and 6 are wound or connected to produce a resultant instantaneous flux in the horizontal direction. This may tend to induce an A.-C. voltage in the direct current coil 9. I may, however, include a reactance 10 in the direct current coil circuit to keep alternating current out of this circuit. It will be evident that in balancing the bridge, if the permanent magnet rotor 3 has its polarized axis at the same angle to coils 5 and 6, as shown, whatever effect it has on the impedance of the A.-C. coils will affect both alike. Under the conditions assumed no torque will be produced on the permanent magnet rotor 3. It is to be understood that the permanent magnet rotor is well stabilized and that the alternating current flux produced therein by the coils 5 and 6 is insufficient to change the polarity or strength of such magnet.

Assume, now, that a small direct current signal supplied to terminals 1 flows in coil 9. This immediately produces a torque on rotor magnet 3 causing it to turn from the position shown. Also, it will turn in a direction determined by the polarity of the direct current signal. Assume that the rotor turns clockwise a few degrees so that its polarized axis is along axis 11—11. In this position of the rotor more of its flux cuts one coil and less cuts the other. I have found that this increases the apparent reactance of coil 6 and decreases the apparent reactance of coil 5, which unbalances the bridge and produces an alternating current output voltage at terminals 2, and the magnitude of this output voltage is proportional to the amount the rotor is turned from a neutral position, and its phase relation with respect to the A.-C. source of supply to transformer 17 depends upon the direction in which the rotor turned and, hence, upon the polarity of the direct current input signal. The question arises of why the rotor did not turn a full 90 degrees so as to be in a zero torque position with respect to the direct current coil 9. I have found that when the polarized rotor is turned from a neutral position within the angle formed by coils 5 and 6, it is subject to a torque produced by the alternating current fluxes tending to return it to a neutral position, which torque opposes the direct current torque. The nature of this A.-C. torque referred to can perhaps best be explained by referring to Figs. 2 and 3.

In Fig. 2, I have shown a single stationary A.-C. coil 12 surrounding a polarized pivoted rotor 3. Assume that a constant A.-C. voltage is applied to coil 12 and that the rotor 3 is slowly turned by hand one revolution in a clockwise direction, and the apparent impedance of the coil and the torque of the rotor are measured for various rotor positions. During such rotation the rotor is free to execute small oscillations as a result of the A.-C. flux in the coil 12. It will be found that the apparent impedance of the coil is a maximum in the zero position of the rotor shown in Fig. 2, and also in a position 180 degrees therefrom, and is a minimum in the 90 and 270 degree position of the rotor, and that such apparent impedance if plotted against rotor positions, will in general resemble the curve I, Fig. 3. In the zero position of the rotor the A.-C. torque thereon is zero. It increases as the rotor is turned towards the 90 degree position, the torque trying to drive the rotor to the 90 degree position. At the 90 degree position the torque reverses as the rotor passes through a neutral torque position and becomes zero again at the 180 degree position, and if such torque be plotted against rotor positions, it will in general resemble the curve T of Fig. 2. It is thus seen that the polarized rotor in an A.-C. field will seek a position where the apparent impedance produced thereby on the A.-C. coil is a minimum and the torque is zero. And such position is where the A.-C. flux and permanent magnet flux are in the same direction, or when the A.-C. coil cuts the minimum permanent magnet field.

In Fig. 1 when the A.-C. bridge is balanced and there is no D.-C. current, the coils 5 and 6 together may be considered as equivalent to the coil 12 of Fig. 2. Hence, as to the resultant flux of coils 5 and 6, the rotor may be considered to be in the 90 degree position referred to in Figs. 2 and 3, and the A.-C. torque thereon is zero. It is now evident that when the D.-C. field coil 9 is energized in Fig. 1 and deflects the rotor to position 11, such D.-C. torque is opposed by an A.-C. torque and an unbalance of the bridge. The apparent impedance of coil 5 is decreased and that of coil 6 increased. There is a corresponding redistribution of the A.-C. currents and an A.-C. torque corresponding to the resultant A.-C. field which increases with turning of the rotor from the neutral position until a balance between the A.-C. and D.-C. torques results, and the rotor comes to rest at an angle from the neutral position which is proportional to the D.-C. current and results in a proportional unbalance and A.-C. output of the bridge. The A.-C. torque here referred to is not to be confused with the A.-C. torque that reverses with the frequency. The vibratory torque between the A.-C. coils and D.-C. flux due to cyclic reversals of the A.-C. current produces minute oscillations beneficial in supplying a mild vibration that tends to reduce static friction and increases sensitivity of the apparatus.

The range of operation of the converter amplifier is within the upper angle formed by the coils 5 and 6. The rotor deflects in one direction from neutral and the bridge is unbalanced in one phase direction for D.-C. currents of one polarity, and the rotor deflects in the opposite direction and the bridge is unbalanced in the opposite phase direction for a reverse D.-C. polarity of the incoming D.-C. signal. It is thus seen that I have provided a phase sensitive proportional D.-C. to A.-C. converter. I have also found that it produces an amplification of the order of 1 to 50. That is, for D.-C. input of from 0 to 1 millivolt, the A.-C. output will vary from 0 to 50 millivolts. For a strict proportionality between input and output voltages, the A.-C. voltage supply to transformer 17 should be constant and this can be assured by making the transformer 17 of the saturable core type so that its secondary voltage will remain constant. For many applications, as for a null balance type of control, normal A.-C. supply voltage variations will be immaterial. The rotary position of the rotor 3 can be used as an indication of the strength and polarity of the D.-C. signal.

In a temperature control system where the D.-C. input signal is supplied by a thermocouple and the A.-C. output is to be used to control an alternating current pilot motor, practicable specifications are as follows:

Rotor 3 may be made of aluminum, nickel, cobalt alloy in accordance with U. S. Patent No. 2,295,082, September 8, 1942, and have a diameter of ¼ inch, and length of .030 inch. The coils 5 and 6 may have 1000 turns each, and the secondary voltage of supply transformer 7 may be 1.0 v. at 60 cycles. The winding 9 may have 200 turns.

In Fig. 4, I have represented another modification of my invention, using parts of a dynamometer type measuring instrument where the permanent magnet field is stationary and the coils rotate and where only one A.-C. coil is used. In Fig. 4 there is provided a stationary magnetic circuit supplied by the permanent magnet 13 and including a magnetic core 14 and the coil air gap 15. Pivoted to rotate in such gap is an armature comprising a direct current coil 16 and an alternating coil 17. The coils are provided with the necessary lead-in spirals one of which is shown at 18, and such spirals furnish a torque opposing rotation of the armature in a clockwise direction. The D.-C. coil 16 is connected to a D.-C. input signal circuit 1 which may be energized by a temperature measuring thermocouple, and the A.-C. coil 17 is connected in one branch of a bridge circuit supplied by the A.-C. transformer 7. The other branch of the bridge circuit contains an impedance represented by a condenser 19 and a reactance 20, which impedance is intended to balance the impedance of the A.-C. winding 17 when there is zero D.-C. input to coil 16, and at which time the output of the bridge at terminals 2 will be zero. When there is no D.-C. input the armature is biased to a certain zero position by the lead-in spirals. It is to be noted that the armature air gap is unsymmetrical and increases abruptly in a clockwise direction. While the A.-C. coil will produce some torque which tends to rotate it in a clockwise direction, the main controlling torques will be furnished by the spirals producing counter-clockwise torque and the D.-C. coil connected so as to produce clockwise torque when energized.

Assume, now, that with no D.-C. current, and with the bridge balanced and with the armature stationary in some such position as represented with the torques thereon balanced, a D.-C. signal current is received. This will produce a clockwise torque and armature rotation against the spiral spring torque, causing the coils to move into a weaker field position in the air gap until the torques are again balanced. (Note the polarity of the D.-C. signal is made such as to produce a D.-C. clockwise torque.) This will change the apparent impedance of coil 17 and unbalance the bridge, producing an A.-C. output at terminals 2 proportional to the D.-C. input signal. This modification is not as sensitive as the apparatus of Fig. 1, primarily because it has only one variable impedance bridge coil, but the general principles of operation are the same.

Referring again to Fig. 1, assume that the D.-C. coil 9 is removed or not used and provision is made for turning the rotor by hand. The rotor is free to oscillate at small amplitude due to the A.-C. flux in coils 5 and 6, so that coupling for manual rotation is required. This may be a standard helical spring. It is evident that this will provide a convenient form of variometer which may be used to obtain a wide range of A.-C. voltage and reverse its phase relation with respect to the input voltage, without the use of movable connectors or switching. In the converter use of my invention it will be noted that the D.-C. and A.-C. circuits can be completely insulated from each other.

What I claim as new and desire to secure by Letters Patent of the United States is:

1. A dynamometer converter comprising a permanent magnet field and a winding system, said field and winding system being relatively rotatable, said winding system having a direct current coil and at least one alternating current coil, an alternating current bridge in which said alternating current coil is included, connections for energizing the alternating current coil and bridge with alternating current and connections for energizing the direct current coil from a varying direct current voltage, said direct current coil when energized acting with the permanent magnet field to produce a torque which determines the rotary relation between the winding system and the permanent magnet field and which relation varies with variations in the value of such direct current energization, such variation also varying the extent to which the alternating current coil is cut by the permanent magnet field flux, the effective alternating current impedance of such alternating current coil and the balance of said bridge, and alternating current output terminals for said bridge, said converter serving to convert such varying direct current voltage into a proportional and amplified alternating current voltage at the output terminals of said bridge.

2. A dynamometer converter comprising a stationary winding system and a rotatable permanent magnet for producing a flux through said winding system, said permanent magnet comprising the only magnetic material linked with said winding system, said winding system comprising a pair of angularly displaced A.-C. coils and a D.-C. coil angularly positioned between the A.-C. coils, all of said coils symmetrically surrounding the rotatable permanent magnet, connections for energizing said A.-C. coils with alternating current, said A.-C. coils when energized producing opposing torques on the rotor which when the D.-C. coil is not energized positions the rotor in a zero resultant A.-C. torque position, and connections for energizing said D.-C. coil with variable direct current to deflect said rotor from said position, such deflection causing the apparent impedance of said A.-C. coils to vary inversely.

3. A dynamometer converter comprising a stationary winding system and a rotatable permanent magnet for producing a flux through said winding system, said winding system comprising a pair of similar, angularly displaced A.-C. coils and a D.-C. coil angularly positioned midway between the A.-C. coils, all of said coils symmetrically surrounding the rotatable permanent magnet, connections for energizing said A.-C. coils with alternating current, said A.-C. coils when thus energized producing opposing torques on the rotor, which when the D.-C. coil is not energized, positions the rotor in a zero A.-C. torque position where it produces equal fluxes through the A.-C. coils, and connections for energizing said D.-C. coil with variable direct current to deflect said rotor from said position by an amount proportional to such direct current energization and thereby causing the amount of D.-C. flux which cuts said A.-C. coils to vary inversely.

4. A dynamometer converter and amplifier system comprising a two-pole permanent magnet rotor, a winding cut by the flux of said permanent magnet rotor, said winding comprising two similar angularly displaced A.-C. coils and a D.-C. coil angularly positioned between the A.-C. coils, all of said coils symmetrically surrounding said rotor, an alternating current bridge circuit in which said A.-C. coils are included as variable impedance arms, said A.-C. coils producing equal and opposite torques on the rotor when the bridge is energized and balanced and the D.-C. coil is not energized, thereby positioning the rotor in a zero resultant A.-C. torque position where it produces equal fluxes in the A.-C. coils, connections for energizing said D.-C. coil with a variable direct current causing the rotor to be deflected from said position in proportion to such D.-C. energization and in a direction determined by the polarity of such D.-C. energization, such deflection causing the apparent impedance of said A.-C. coils to vary inversely with respect to each other and resulting in a corresponding unbalance of the alternating current bridge, and connections to said bridge for taking off a phase sensitive A.-C. voltage which is proportional to the bridge unbalance.

5. Electric control apparatus comprising a pair of angularly displaced A.-C. coils and a permanent magnet for producing flux through said coils, said permanent magnet comprising the only magnetic material linked by said coils, said coils and magnet being relatively rotatable for the purpose of varying inversely the relative amount of permanent magnet flux threading said two coils, such variation also varying inversely the apparent A.-C. impedance of such coils, and means for varying the relative rotary position of said magnet and coils.

CLEMENT F. TAYLOR.

REFERENCES CITED

The following references are of record in the file of this patent:

UNITED STATES PATENTS

| Number | Name | Date |
|---|---|---|
| 1,824,577 | Sorensen | Sept. 22, 1931 |
| 2,342,637 | Bechberger | Feb. 29, 1944 |
| 2,368,701 | Borden | Feb. 6, 1945 |
| 2,405,049 | Pattee | July 30, 1946 |
| 2,432,399 | Edwards | Dec. 9, 1947 |